Patented Feb. 13, 1940

2,190,001

UNITED STATES PATENT OFFICE 2,190,001

RECOVERY OF PHTHALIC ACID FROM GASES CONTAINING PHTHALIC ANHYDRIDE

Guy W. Talbert, Summit, N. J., assignor to National Aniline and Chemical Company, Inc., New York, N. Y., a corporation of New York No Drawing. Application April 6, 1939, Serial No. 266,414

6 Claims. (Cl. 260—525)

This invention relates to improvements in the removal of phthalic anhydride from gases by contact of the gases with aqueous liquids.

The invention is particularly concerned with the recovery of phthalic anhydride from a reaction gas, such as that obtained in the vapor phase oxidation of polynuclear aromatic hydrocarbons, wherein the gas is brought into intimate contact with an aqueous phthalic acid solution to form a phthalic acid slurry. Such processes are described in United States Patents 2,071,329 and 2,071,357.

The present invention has for its purpose an improvement in the nature of the slurries obtained, whereby they may be handled with greater facility in contact apparatus, pipe lines, treatment vessels, pumps, etc., and whereby any tendency toward clogging of such apparatus may be avoided.

When phthalic-anhydride-containing gas is brought into contact with a solution consisting of water saturated with phthalic acid, especially such a solution containing other reaction products of the vapor phase catalytic oxidation of polynuclear aromatic compounds, such as naphthalene, the phthalic acid formed by contact of the anhydride and water has a tendency to agglomerate in the form of crusts and lumps. If the process is operated by bubbling the gas through a body of liquid, crusts may form around or within the outlet end of the dip pipe. Agglomeration on the other hand may result in clogging of the recovery system, or where a packed contact tower is employed, in clogging of the packing.

By the process of the present invention phthalic anhydride is removed from a gas containing phthalic anhydride vapor by contacting said gas with an aqueous liquid containing a wetting agent.

By the use of an aqueous absorption liquid containing a wetting agent, I have found that the formation of incrustations and lumps of phthalic acid of substantial size may be avoided and a smooth, freely flowing, uniform slurry may be obtained which has no tendency to form incrustations or to agglomerate into lumps capable of clogging the system.

The process of my invention is applicable to gases of varied phthalic anhydride content such as are formed in vapor phase oxidation processes of the aforementioned type and it is capable of producing slurries containing from only a few per cent up to 30 per cent and more of solid phthalic acid. The aqueous liquid is maintained preferably at a temperature between about 35° C. and about 70° C. but temperatures above or below this range may be employed. Suitable heat exchange apparatus may be provided to maintain the preferred temperature in those cases where its maintenance is not a normal result of a balanced heat exchange between the gas, absorption liquid and surrounding atmosphere.

Any wetting agent which is compatible with the phthalic acid may be employed. Wetting or dispersing agents are generally sulfuric acid or phosphoric acid derivatives either of aliphatic compounds (including hydrocarbon chain compounds and chain compounds in which the chain is interrupted by another group such as an ester group) or of aromatic compounds, which may or may not be substituted. Such materials may be present in the aqueous solution as the free-acids or as their water-soluble salts although it is probable that the phthalic acid present converts at least a part of the salt to the free acid. A wetting agent should be selected which does not cause foaming of the aqueous solution since such foaming results in priming and interferes with the efficient recovery of the phthalic acid.

Examples of suitable wetting agents are alkyl naphthalene sulfonic acids, such as the isopropylated and butylated naphthalene-sulfonic acids, sulfonic acids of formaldehyde-naphthalene or formaldehyde-phenol condensation products, sulfated higher fatty acids, such as Turkey red oil, etc.

The proportion of wetting agent present in the aqueous absorption liquid depends upon the effectiveness of the individual wetting agent employed. Thus, for wetting agents such as sulfonated castor oil, concentrations between about 0.3 and about 0.5 part by weight of the wetting agent per 100 parts by weight of water may be used to advantage.

The phthalic-anhydride-containing gas may be contacted with the aqueous liquid in any convenient contact apparatus, for example, apparatus arranged for bubbling the gas through the liquid or spraying the liquid into the gas or exposing streams or films of the liquid to the gas.

The following example illustrates the process of the present invention as applied to the recovery of phthalic anhydride from hot reaction gases obtained by the vapor phase catalytic oxidation of naphthalene with air employing an air to naphthalene weight ratio in the neighborhood of 30 to 1.

The hot reaction gas, containing phthalic anhydride and relatively small amounts of maleic anhydride, together with carbon dioxide, nitrogen, water vapor, etc., after cooling from reaction temperature to about 200° C., is introduced by means of a dip pipe (which may be a vacuum-jacketed or otherwise insulated pipe exhausting 6 or 8 inches beneath the surface of surrounding liquid) into a body of water containing about 0.5 part by weight of commercial sulfonated castor oil per 100 parts of water. The temperature of the water rises to about 40° C. and remains fairly constant at about this temperature as a result of the balance between heat added by incoming gas and heat withdrawn by evaporation of water and by radiation. Phthalic anhydride in the gas reacts immediately with the water to form phthalic acid which is retained in the aqueous liquid. Any maleic anhydride present in the gas is simultaneously dissolved in the aqueous absorption liquid. In this way the concentration of phthalic acid is built up until a smooth slurry containing between about 10 per cent and about 12 per cent of suspended phthalic acid crystals is obtained. This slurry may be drawn off, filtered to remove solid phthalic acid, and the filtrate returned to the contact apparatus, continuously or intermittently. A portion of the filtrate may be drawn off either continuously or intermittently for recovery of maleic acid and/or recovery or disposal of other by-products.

A second contact unit containing a similar concentration of wetting agent may be provided following the first to catch any spray which may be carried along with the gas leaving the first contact unit. Solution from the second unit may be passed periodically or continuously into the first unit. By maintaining a low phthalic and maleic acid concentration in the second unit any spray carried to the atmosphere by the exhaust gases will be essentially free of phthalic and maleic acids. Instead of employing a dip pipe in the second contact unit it may be advantageous to employ a contact apparatus wherein the gas merely passes over the surface of the liquid so that entrainment of any additional spray is avoided.

The gas after treatment in the second contact unit is at a temperature of about 40° C. and is essentially free of phthalic or maleic acid or anhydride and may be exhausted to the atmosphere.

I claim:

1. In the removal of phthalic anhydride from a gas containing phthalic anhydride vapor by contact of the gas with an aqueous liquid, the improvement which comprises maintaining in the aqueous liquid a wetting agent.

2. In the recovery of phthalic anhydride in the form of an aqueous phthalic acid slurry from a hot gas containing phthalic anhydride vapor, the improvement which comprises passing the gas into contact with an aqueous phthalic acid slurry containing a wetting agent.

3. In the recovery of phthalic anhydride as an aqueous phthalic acid slurry from a hot gas containing phthalic anhydride vapor, the improvement which comprises contacting the hot gas with an aqueous phthalic acid slurry containing a wetting agent and maintained at a temperature between about 35° C. and about 70° C.

4. In the recovery of phthalic anhydride from a hot reaction gas obtained by the catalytic vapor phase air oxidation of a polynuclear aromatic compound, the improvement which comprises cooling the hot reaction gas to about 200° C. and introducing it into contact with an aqueous phthalic acid slurry containing a non-foaming wetting agent and maintained at a temperature between about 35° C. and about 70° C.

5. In the removal of phthalic anhydride from a gas containing phthalic anhydride vapor by contact of the gas with an aqueous liquid, the improvement which comprises employing as the aqueous liquid a phthalic acid solution containing an aliphatic sulfonate wetting agent of the non-foaming type.

6. In the recovery of phthalic anhydride from a hot reaction gas obtained by the catalytic vapor phase air oxidation of naphthalene, the improvement which comprises cooling the hot reaction gas to about 200° C. and introducing it into contact with an aqueous phthalic acid slurry containing about ½% of sulfonated castor oil and maintained at a temperature between about 35° C. and about 70° C.

GUY W. TALBERT.